United States Patent [19]
Sutherland

[11] Patent Number: 5,838,939
[45] Date of Patent: Nov. 17, 1998

[54] MULTI-ISSUE/PLURAL COUNTERFLOW PIPELINE PROCESSOR

[75] Inventor: Ivan E. Sutherland, Santa Monica, Calif.

[73] Assignee: Sun Microsystems, Inc., Palo Alto, Calif.

[21] Appl. No.: 853,970

[22] Filed: May 9, 1997

[51] Int. Cl.$^6$ ........................................................ G06F 9/38
[52] U.S. Cl. ...................................... 395/376; 395/800.01
[58] Field of Search ..................................... 395/376, 377, 395/390, 392, 394, 395, 561, 566, 551, 553, 800.01, 800.1, 800.18, 800.23, 800.25, 800.26

[56] References Cited

U.S. PATENT DOCUMENTS

| | | | |
|---|---|---|---|
| 4,916,606 | 4/1990 | Yamaoka et al. | 395/394 |
| 4,964,046 | 10/1990 | Mehrgardt et al. | 395/800.36 |
| 5,187,800 | 2/1993 | Sutherland | 395/800.18 |
| 5,488,729 | 1/1996 | Vegesna et al. | 395/385 |

*Primary Examiner*—Parshotam S. Lall
*Assistant Examiner*—Viet Vu
*Attorney, Agent, or Firm*—Townsend and Townsend and Crew LLP

[57] ABSTRACT

A computer system architecture is described for providing increased performance in a counterflow pipeline processor. The system includes an instruction fetching unit, a register file, and a pipeline connected between the instruction fetching unit and the register file. The pipeline is formed from a group of sequential stages. Each stage in the pipeline includes a first instruction register for storing a first instruction, a second instruction register for storing a second instruction, and a first results register for storing results. The instructions are transferred in a first direction from stage to stage, and results are transferred in an opposite direction from stage to stage. The registers for the instructions include an operand field, a first source field for the operand, a second source field for the operand, and a destination field. Each of the fields itself includes a register name, a value, and a validity bit. In operation instructions and results pass each other in the pipeline and the results of execution of the instructions are transferred to the register file and to the results fields. In another approach to providing improved performance plural pipelines are employed, individual ones of which may have multiple instruction registers therein.

25 Claims, 4 Drawing Sheets

5,838,939

MULTI-ISSUE/PLURAL COUNTERFLOW PIPELINE PROCESSOR

BACKGROUND OF THE INVENTION

This invention relates to computer architectures, and in particular to a class of such architectures we refer to as counterflow pipeline processors. Counterflow pipeline processors are computer system processors in which instructions and results flow in opposite directions within a pipeline and interact as they pass. More specifically the invention relates to such architectures in which multi-issue pipelines or plural counterflow pipelines, or both, are employed.

In counterflow pipeline processors, a pipeline is formed from stages, each of which includes an instruction portion and a results portion. Instructions flow in one direction through the pipeline, while results flow in the other direction. If instructions are thought of as flowing upward, then at any instant the instruction pipeline looks like a program listing, although the actual direction of instruction flow is of no significance.

Continuing this analogy, instructions enter the bottom of the pipeline from an instruction fetch unit. Each instruction executes at some stage in the pipeline, but different types of instructions may execute in different stages. If an instruction is not ready to execute when it reaches its execution stage, it waits there until it is ready. The pipeline retains the physical sequence of instructions, but permits instructions to execute in any temporal order, based on when an instruction reaches the appropriate stage of the pipeline. Each instruction carries with it the names or identifiers of its source and destination operands and their values, if known. Initially when the instruction enters the pipe, the values are unknown and will eventually be copied from the results stream flowing past in the other direction.

Results enter the result stream either from a register file at the top of the pipeline or when instructions execute. Each result carries a name and a value. The names of results may correspond to the register names of source or destination registers of the instructions, and it is important that it be a unique identifier of the operand. Results stay in physical sequence only if they carry matching names. Results with different names may overtake each other in the results pipeline.

Initially the values of results are unknown, but as execution proceeds, the instruction copies the values it needs from the stream of results coming down from previous instructions. We use the term "garner" to denote the process of copying source values into an instruction. An instruction "garners" the values it needs from the results that it meets flowing past in the other direction.

Result values may also change when a result and an instruction meet. If the instruction has already computed a fresh value for the register named in the result, the result takes on this latest value. If the instruction intends to, but has not yet computed a fresh value for the register named in the result, the result is rendered invalid. We use the term "renrag" (garner spelled backwards) to describe the processor copying destination values into the results. Whenever an instruction and a result meet, the garner and renrag processes interchange values between them as appropriate.

A more detailed discussion of prior work on counterflow pipeline processors is described in a publication "Counterflow Pipeline Processor Architecture" available from Sun Microsystems, assignee of this invention, as report SMLI TR-94-25. It is also the subject of commonly-assigned U.S. Pat. No. 5,187,800, entitled "Asynchronous Pipelined Data Processing System."

As the capabilities of modern microprocessors increase, and as the amount of circuitry which can be placed on a single integrated circuit expands, it is desirable to provide enhanced execution of instructions in counterflow processors.

SUMMARY OF THE INVENTION

The counterflow pipeline processor architecture of this invention includes an instructions fetching unit and a register file. The two are connected by a pipeline having a desired number of stages. At each stage desired operands in the instructions may be executed.

Instructions are fetched by the instruction fetching unit and dispatched into the pipeline in order. As the instructions flow upward, results from execution of the instructions, or other data, flow downward through the pipeline. At each stage the names of the results and the names of the instruction sources and destination are compared. Upon a match either the value of the results is updated, or the sources or destinations of the instructions are updated.

In one embodiment, by including registers for two or more instructions in each stage, improved performance can be obtained. Such an approach enables more instructions to move through the pipeline than when only a single instruction register is provided. Each instruction register includes an operation field, a first operand source field, a second operand source field, and a destination field. (Any desired number of operand sources and destinations may be provided.) As the instructions move through the pipeline, a portion (the register name) of the source and destination fields is compared with the corresponding portion (also the register name) of the results fields. When the register names correspond, information can be transferred between the instructions and results.

In another embodiment of the invention, at least three pipelines are provided between the instruction fetching unit and the register file. One pipeline includes stages for first instruction registers, while the second pipeline includes stages for second instruction registers. The third pipeline includes the results registers. With such an approach, floating point instructions, for example, can be dispatched to one pipeline, while fixed point instructions, for example, are dispatched to another pipeline. Another possible approach is to dispatch alternate instructions to each pipeline. Just as in the first embodiment, the contents of the various registers and the various pipelines may be compared with each other to update operand source fields and result fields as the instructions move through the pipeline in one direction and the results move through the pipeline in the other direction. In this embodiment, an additional interlock circuit is provided for each stage in the pipeline. The interlock circuit assures that instructions advancing in the various pipelines are maintained in an appropriate sequence.

DESCRIPTION OF THE SPECIFIC EMBODIMENTS

Figure 1:
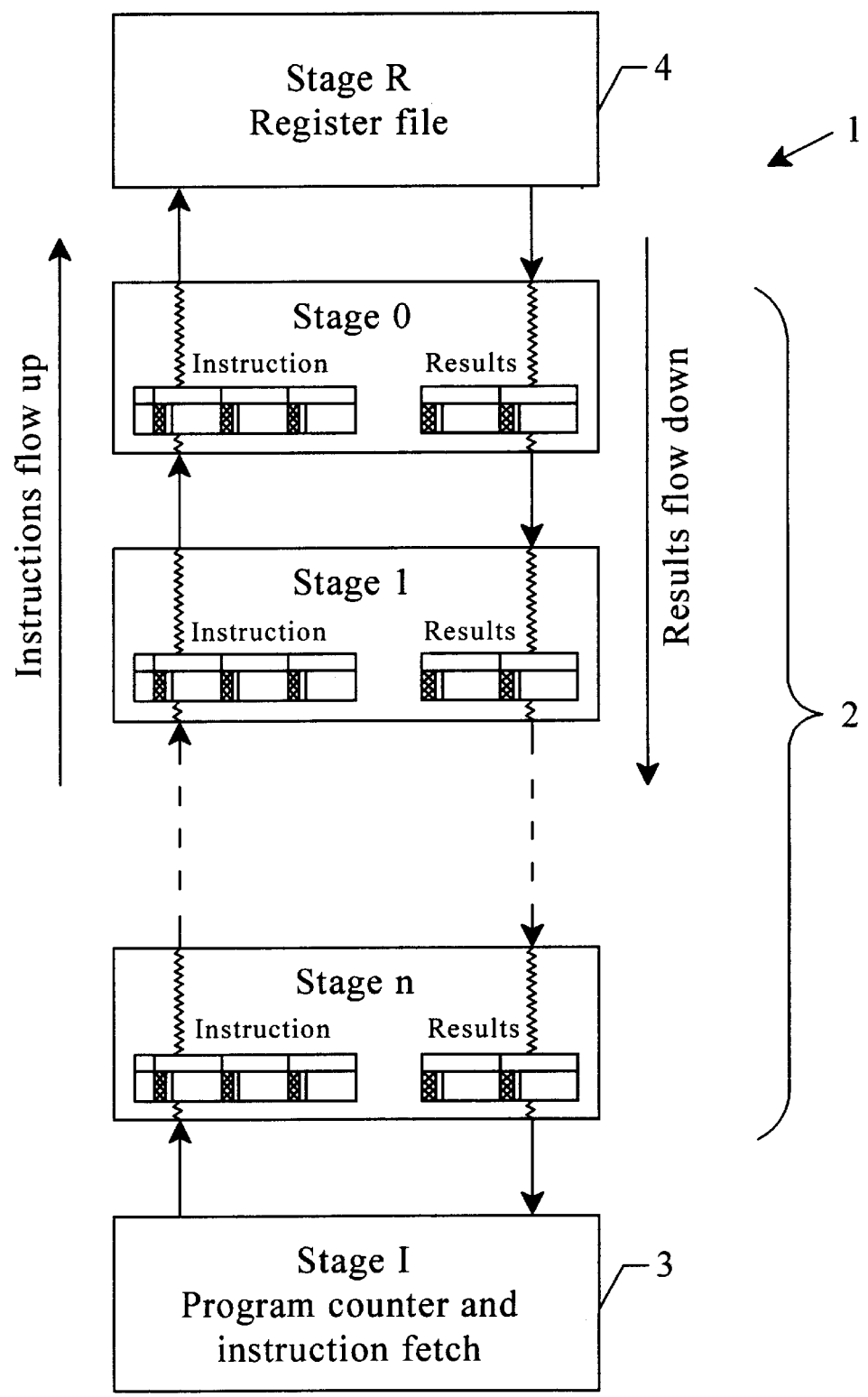
FIG. 1 illustrates a typical structure for a prior art counterflow pipeline processor.

FIG. 1 illustrates a typical structure for a prior art counterflow pipeline processor (herein sometimes CFPP). Because the preferred embodiments of this invention employ the basic concepts of counterflow processing, an explanation of FIG. 1 enables a better understanding of the preferred embodiments herein. The CFPP 1 uses a bidirectional pipeline 2 in which instructions flow in one direction and results flow in an opposite direction to move partially executed instructions and results in a regular way, subject to a few pipeline rules discussed below that guarantee correct operation.

In the CFPP 1, an arbitrarily long pipeline 2 connects an instruction fetch unit 3 at the bottom with a register file 4 at the top. The instructions are depicted as flowing up through instruction pipeline 2 so that the sequence of instructions in the pipeline resembles a listing of that section of code. Earlier instructions are above later ones and remain so because the implementation forbids instructions to pass one another. Instructions move up the pipe 2 as far and as fast as they can, stalling only when the pipeline stage (designated stage 0, stage 1, . . . stage n) in FIG. 1 immediately above cannot yet accept a new instruction or when the instruction reaches the last pipeline stage that is equipped to execute it. Above a stalled instruction, a gap of arbitrary size may open in the pipeline. It is not necessary for every stage to be "full" with an instruction. Control circuits (not shown) assure that instructions move at appropriate times and do not overwrite other instructions, and that the motion of results and instructions however, each stage in the pipeline 20 contains two instructions. For example, in stage 0, the instructions are designated Instruction A and Instruction B. As described earlier, the instructions are depicted as flowing up through instruction pipeline 20, with earlier instructions above later ones. Instructions C and D were issued after instructions A and B, while Instructions M and N were issued still later. Instruction pairs move up the pipe 20 as far and as fast as they can, stalling only when the pipeline stage immediately above cannot yet accept a new instruction pair or when one of the instructions in the pair reaches the last pipeline stage that is equipped to execute it.

Figure 2:
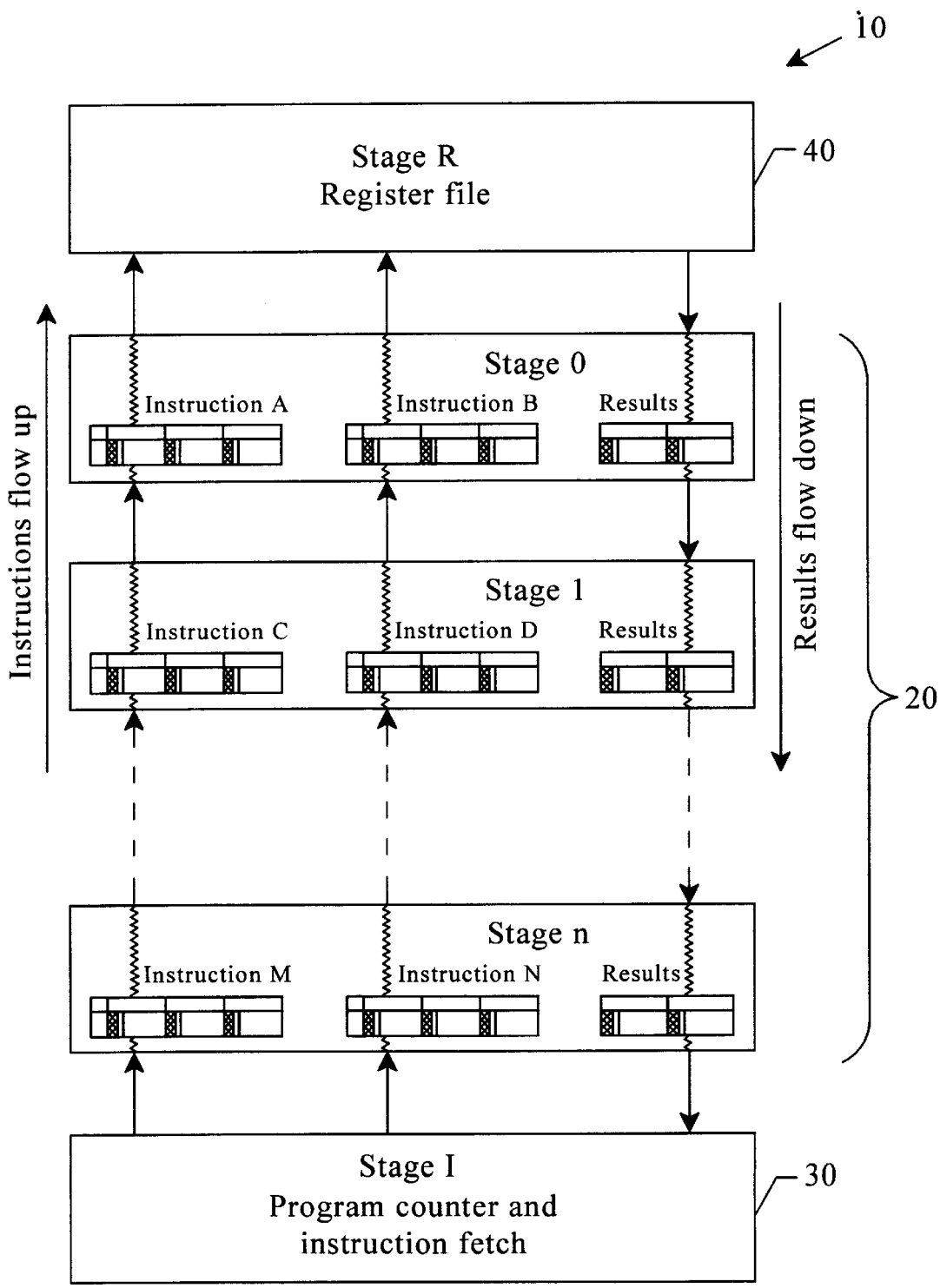
FIG. 2 illustrates a preferred embodiment of a multi-issue counterflow pipeline processor.
Figure 3:
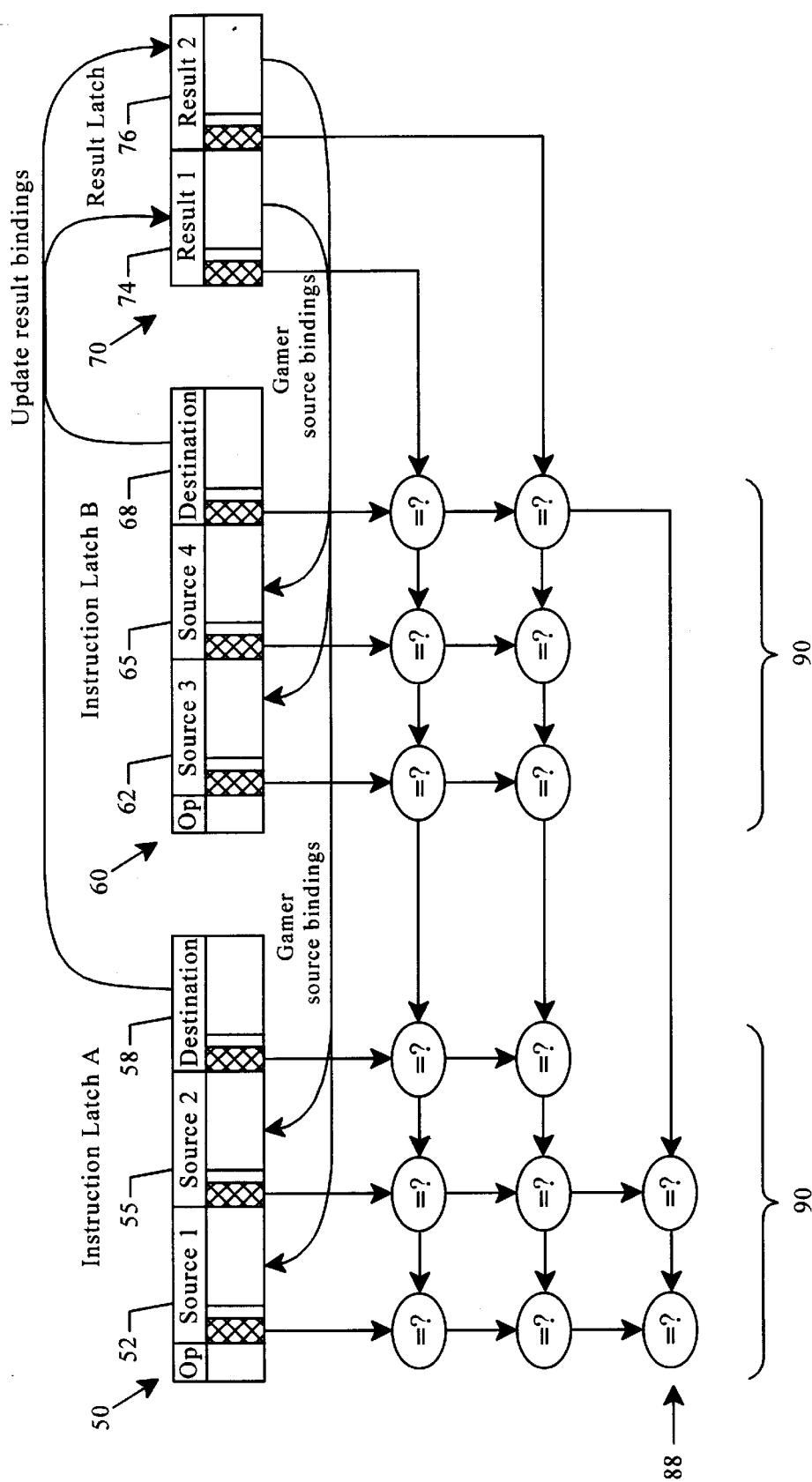
FIG. 3 illustrates the data (and latch) structure for each instruction and result stage in the pipeline shown in FIG. 2.

FIG. 3 illustrates the data structure, and therefore the latch structure as well, for each instruction and result stage n in the pipeline 20 shown in FIG. 2. Although the implementation shown in FIG. 3 is for a dual instruction pipeline, it will be appreciated that any number of instructions desired, i.e., more than two, can be implemented in a corresponding manner. Illustrated in FIG. 3 is how each instruction 50, 60 carries with it bindings for its source operands 52, 55, 62, 65 and its destinations 58, 68 as well as how a result 70 carries with it bindings for its result values 74, 76. Each binding, for both instructions and results, associates a data value 80 with a register name 84, and a validity bit 85 to indicate whether the association is valid.

The pipeline stage illustrated in FIG. 3 shows three bindings with each instruction, e.g., two sources 52, 55 and one destination 58 associated with instruction 50, and two sources 62, 65 and one destination 68 associated with instruction 60. Of course, other numbers of sources and destinations can also be used. When an instruction 50 or 60 is executed, new data is placed into the data values 80 of the destination bindings 58, 68 which are then marked valid using bit 85. When the instruction 50, 60 reaches the top of the pipeline, the data values recorded in destination bindings 58, 68 are written into the corresponding locations in the register file 40 (see FIG. 2). Until this final record is made in the register file 40, instructions 50, 60 are considered speculative and may be canceled as needed if required by a trap or branch.

Whenever an instruction 50, 60 is executed, the outputs are used in three ways. First, they are entered in the instruction's destination bindings 58, 68 and are eventually retired into the register file 40 as described above. Second, each destination binding 58, 68 is inserted into the downward-flowing results pipeline so that it may be observed by subsequent instructions. Third, the results may be used within an instruction group, for example, if a junior instruction requires results from a senior instruction in the group. This is discussed further below. As shown in FIG. 3, for this embodiment each stage of the results pipeline accommodates two bindings 74, 76.

Any later instruction in the pipeline that requires a source binding 52, 55, 62, 65 whose register name 84 matches the register name 84 of a result binding 74, 76 will garner the value by copying and retiring the value in the binding in the instruction pipe. The comparison operation among the names of the source registers 52, 55, 62, 65; names of the destination registers 58, 68; and the names of the results registers 74, 76 is performed by the group of comparators 90 illustrated as ovals in FIG. 3. The circuit design for such comparators is well known. Thus, the results pipeline provides the function that in conventional processor designs is called "bypassing" or "forwarding," and does so in a way that is uniform for all stages.

By virtue of the comparisons being performed, result bindings flowing down may be modified by subsequent instructions. Using the comparators, each stage 50 and 60 in the pipeline detects matches between instruction and result bindings, i.e., cases when the register name 84 in an instruction binding matches the register name 84 in a result binding (see FIG. 3). An instruction 50, 60 that has already executed and has a destination binding 58, 68 that matches a result binding 74, 76 must copy the value from the destination binding 58, 68 into the result binding 74, 76. In this way later instructions garner the most recent binding for any register.

A different situation arises if the instruction 50 or 60 has yet to execute. In this case, any result binding 74, 76 that matches a destination binding 58, 68 in the instruction is deleted (termed "killed" herein) from the result pipeline, because the binding will not be valid for still later instructions. Thus, a particular result binding 70 typically passes only a short span of instructions 50, 60, namely, the section after the instruction that computes the value and up to the next instruction that overwrites that value. These result-modification rules assure that any result 70 that meets an instruction 50, 60 in the counterflow pipeline holds bindings that are correct for that instruction 50, 60. Several different bindings for a register may be in transit in different parts of the results pipeline at the same time. The use of such multiple result bindings serve the same function as "register renaming" in conventional processor designs.

The register file 40 (see FIG. 2) is also a source of operands for instructions. For this reason, the register file 40 is the principal source of bindings inserted into the results pipe. In the preferred embodiment, from among the many policies that might be appropriate for determining which register values to fetch and send down the pipe, the system chooses to send down the results pipe those bindings that are known to match sources of instructions in the pipe. These register values are garnered by the relevant instructions and thus enable the instructions to execute. In one implementation of this policy, the instruction-decoding stage sends source register addresses to the register file, which fetches register values and sends corresponding bindings down the results pipe.

To insure correct operation, the CFPP must detect matching bindings in each result flowing down with each instruction flowing up. Each result must meet every subsequent instruction in some pipeline stage, where the comparison is done. By using appropriate control circuitry, adjacent pipeline stages are prevented from swapping an instruction and result "at the same time," which would prevent detecting matches. The interface between stages may either pass an instruction up or a result down, but never both. In an asynchronous implementation of the CFPP, an arbiter between each pair of stages may be used to enforce this communication protocol.

Each stage in the pipeline operates according to certain rules. With respect to instructions:

1. Instructions must stay in program order in the instruction pipeline.
2. If all of the source bindings for an instruction are valid, and if the instruction is held in a stage that contains suitable computing logic, the instruction may execute. When an instruction completes execution, its destination bindings(s) are marked valid and value(s) are inserted.
3. When an instruction completes execution, one or more copies of each of its destination bindings is inserted into the results pipeline.
4. An unexecuted instruction may not pass beyond the last stage of the pipeline capable of executing it. In particular, an instruction cannot be retired into the register file until it has executed. With respect to matching rules that apply when an instruction and result are present in the same pipeline stage and have matching bindings:
1. If a valid result binding matches an invalid source binding, copy the result value to the source value and mark the source valid.
2. If an invalid destination binding matches a valid result binding, mark the result binding invalid.
3. If a valid destination binding matches a result binding, copy the destination value into the result value and mark the result valid.
4. Within a group, destinations and sources need to be treated appropriately.

In the multi-issue system, each instruction must wait at its execution stage until it is ready to execute. One problem is that the separate operations in a multi-issue instruction may need to execute in different stages. The composite instruction will stall at the first stage to compute any part of the composite instruction until it garners the sources required for that computation. Unfortunately, the operation causing the stall may depend on results from some other part of the composite instruction, earlier in instruction sequence, that will not be computed until a later stage in the pipeline. If the separate operations in the composite instruction appear in an order incompatible with the order of stages in the pipeline, such a stall may cause deadlock. Such deadlocks are avoided by providing mechanisms for execution of the instructions within a group in a prearranged manner, as described below.

In some embodiments of the invention the results path can be broadened as well. In other words, two or more result registers can be used. In empirical tests we have performed, however, the statistics of real instructions show that they use only slightly more than one source value each. Second, a register cache, even a small one, minimizes access to the register file and thus reduces result pipeline traffic. Third, results last only a short distance in the result pipe, namely from where they are generated to where they are killed. Two nearby instructions with the same destination register together produce only one result pipe element. Thus making the pipeline longer has the effect of increasing the bandwidth of the results pipe. Fourth, a pair of instructions may generate and consume results in common. By pairing instructions we increase their per stage access to the results pipe. If both require a common source register, it need appear in the results pipe only once. If the two instructions have a common destination, together they produce only a single result. In the case that a group of instructions share names, special care must be taken to assure proper execution.

Additional arithmetic units can be provided to serve the multi-issue pipeline. For example, two ALUs can be employed, one for each side of the instruction pipe, with repetitions of the twin ALU at several different stages. In the preferred embodiment, a single ALU (not shown) is shared between the two halves of the instruction pipeline, making use of the statistical chance that the paired operations differ. In such embodiments, if both operations have garnered all of their source values and both need the same ALU, it is used in sequence by first one instruction, then the other. In the preferred embodiment a single ALU is used in any one stage. Contention for such a single ALU is minimal for two reasons. First, it is statistically unlikely that both instructions will require the same kind of ALU. Second, even if they do, one instruction of the pair usually garners its resources before the other. The instruction not yet ready is not yet a contender for the ALU. In other embodiments several ALUs are provided, but placed in separate stages to be shared by the instruction pairs. Such an approach permits partially complete pairs to advance to another stage for completion. In still further embodiments more arithmetic units are provided to serve the multiple instruction per stage pipe. In such embodiments, two ALUs, one for each side of the instruction pipe, are provided.

An instruction pair is more likely than a single instruction to require service in any given stage. Some pairs will require double service time. Thus, compared to the single issue pipeline, a double issue pipeline will have a wider variety of service times. If needed, fast buffering stages can smooth out the work load of a variable delay stage if placed both before and after it.

Figure 4:
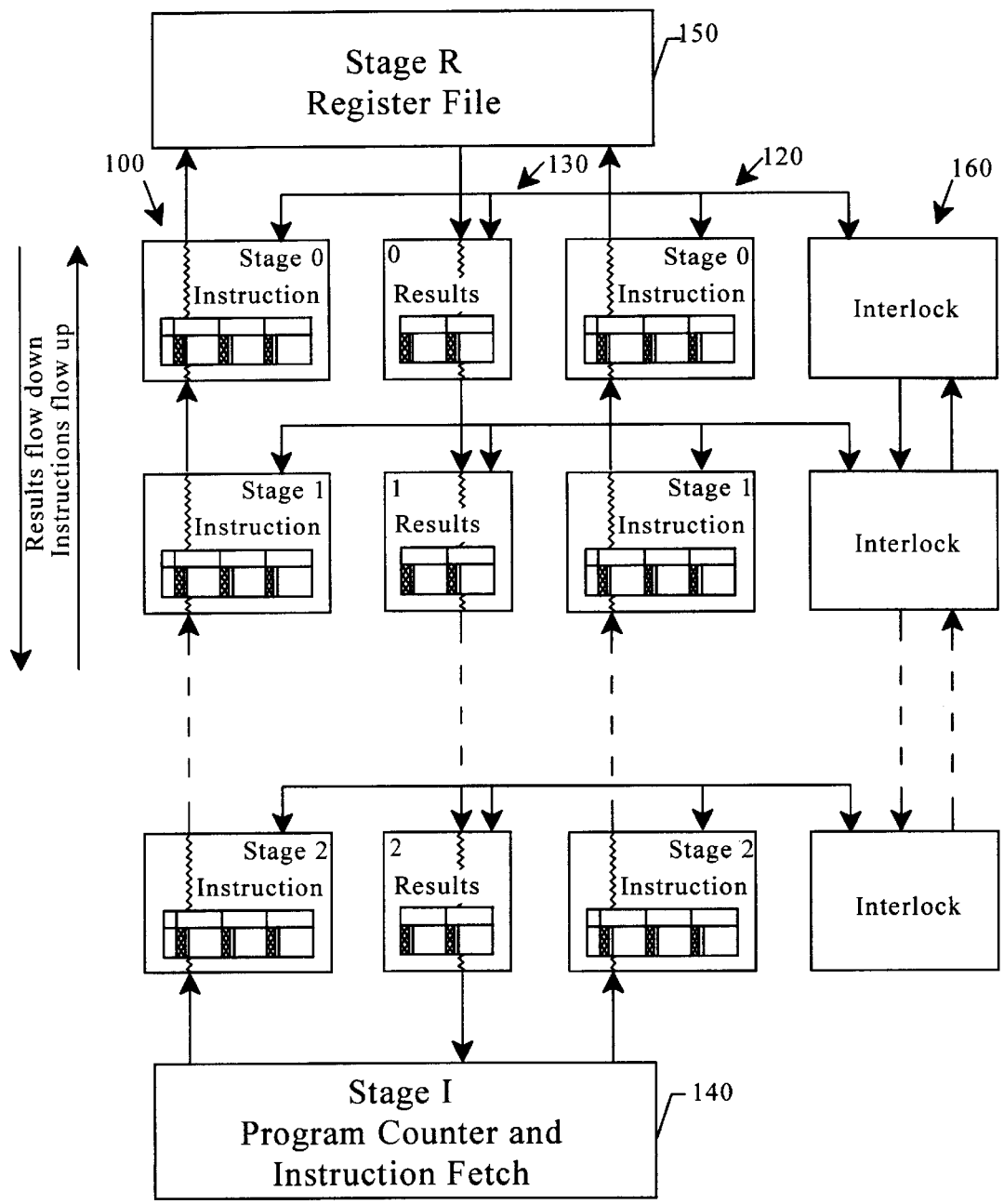
FIG. 4 illustrates another embodiment of a counterflow pipeline processor in which several separate pipelines are employed to issue multiple instructions.

The multiple issue approach described above retains the programmer's model of sequential execution. The model is preserved in the dual instruction pipeline if each stage processes each pair properly, that is, with respect to the treatment of results, not necessarily in the sequential order of issuance. If the earlier instruction of a pair kills a result, that result must not be visible to the later instruction of the pair. The flexibility of the pipeline provides a great advantage in design. The execution order, even within the pair; need not be retained—either of the pair may execute first. Care is needed only in how the pair of instructions work together to garner and kill results. In the preferred embodiment this is achieved by providing extra comparators which compare the destinations of instructions in a group. See comparators 88 in FIG. 3, for example. If additional bandwidth is desired, a register file cache can be provided. Such a cache is described in commonly assigned U.S. patent application Ser. No. 08/758,802, entitled "A Register Cache for Providing Register Values to a Computer Processor", filed Dec. 3, 1996, now abandoned. Another way to achieve parallel issue of instructions, other than the multi-issue approach described above, is to use several separate pipelines. FIG. 4 illustrates this embodiment. As depicted, there are two pipelines 100, 120 for instructions, and one pipeline 130 for results. Of course, additional instruction and results pipelines may be provided. The instruction pipeline 100 includes an arbitrary number of separate stages, as described above. The other instruction pipeline 120 also includes separate stages, typically consisting of the same number of separate stages as pipeline 100. An instruction fetch unit 140 at the bottom is connected to both pipelines 100 and 120 to supply each with instructions. A register file 150 at the top is connected to both of the pipelines 100, 120 to accept results from them. As described, the instructions are depicted as flowing up through instruction pipelines 100, 120. Earlier instructions in a single pipeline 100 or 120 are above later ones. Instructions move up each of the pipelines 100, 120 as far and as fast as they can, stalling only when the pipeline stage immediately above cannot yet accept a new instruction or when the instruction reaches the last pipeline stage that is equipped to execute it. Also, as described, above a stalled instruction, a gap of arbitrary size may open in the pipeline. The pipelines are independent because the instructions in them use different register sets. They are joined at the bottom by an instruction issue mechanism 140 that sends instructions into the proper pipeline. In the preferred embodiment, one such pipe serves mainly for floating point operations, while the other pipe serves mainly for fixed point operations.

In the architecture depicted in FIG. 4, instructions may be issued into the two pipelines alternately. If the instructions come from the same instruction sequence it is desirable to have an additional mechanism to prevent instructions in one pipeline from passing instructions in the other to retain their mutual sequence. The order of instructions between the two pipes is maintained by an interlocking mechanism 160. This circuit prevents later issued instructions in one pipeline from getting ahead of earlier issued instructions in the other pipeline. Thus instructions are retired in the register file 150 in the same order in which they are issued by the instruction fetch 140. A circuit suitable for providing the required interlocking mechanism is described in commonly assigned copending U.S. patent application Ser. No. 08/636,260, entitled "Interlocked FIFO Control Circuits," and filed Apr. 23, 1996, now U.S. Pat. No. 5,758,139.

It is also possible to maintain sequential operation between the two pipelines if they have different functions. For example, assume a program interdigitates groups of floating point operations and groups of fixed point operations. The fixed point operations provide index values for the floating point arithmetic. The result of several fixed point operations is a single such index value. Such an interdigitated set of instructions can be divided into two pipelines.

In the floating point pipe each group of fixed point operations is replaced by a "summary" operation. Such a summary operation says, in effect, "a value for register X will appear at this point in the instruction stream." Similarly, in the fixed point pipe, each group of floating point operations can be replaced by a "summary" operation, effectively, "at this point the following registers are computed."

The communications means between the pipes uses the summary operations to introduce results into the other results pipe. The summary operations also serve to kill obsolete results in the results path. Because they kill results, the summary operations partition the results path into its proper parts, just as operations that produce destination values partition the result stream in a single pipeline.

The instruction and result binding mechanism for the embodiment depicted in FIG. 4 can be the same as the system depicted in FIG. 3. The fact that the instructions are in functionally separate pipelines does not change the operation as compared to the single multi-issue pipeline described above.

In the multiple pipeline embodiment described above, the instructions in both pipelines interact with values from the single results pipeline. Both the garner and renrag operations will occur. Suitable arbitration circuits and suitable name comparison circuits must be duplicated between each of the instruction pipelines and the results pipeline. This approach provides a significant advantage because twice as many instructions issue per unit time as each result may enter either of two pipelines.

In some circumstances such a system may put too heavy a burden on the results pipeline. In those circumstances it is possible to have several results pipelines as well. The architecture permits results to pass each other provided they have different names. Thus, it is useful to put different kinds of names in different results pipes. For example, in a system with two result pipes, results with even names can be put into one pipe, while those with odd names go into the other. Alternatively, the result names can be divided into groups by some other condition, e.g. names later in the alphabet into one pipe and those earlier in the alphabet into the other.

The number of control circuits and the number of comparison circuits required is the product of the number of pipelines flowing in one direction with the number of pipelines flowing in the other direction. Additional comparators 88 may be needed for intragroup comparisons. For example, a system with three instruction pipes flowing up and two result pipes flowing down requires six arbiters and six comparison circuits per stage. Reliable interaction of this kind in an asynchronous device requires arbitration. Each stage of each pipe requires one arbiter for each of the counter flowing pipelines. Similarly, each stage of each pipeline requires name comparison circuits to compare its names against those in the counter flowing pipelines. Thus the number of circuits is related to the product of the number of pipes flowing in the two directions, with additional circuits added to assure appropriate intragroup coordination.

As mentioned above there are additional comparators 88 required for coordination of the execution of instructions within a given group. The particular coordination required depends upon the particular implementation chosen for the instruction and results pipelines.

With respect to the instruction pipeline, there are three possible arrangements. In a first arrangement each pair of instructions moves through the pipeline in a "lockstep" manner. This is the implementation depicted in FIG. 3 in which the additional comparators 88 are required to assure that any results from an executing senior instruction are passed to an appropriate junior instruction within the pair (or larger group) to enable that junior instruction to execute.

Another possible relationship of instructions within the instruction pipeline is that they form disjoint sets. In this circumstance the instructions are compiled such that each pair (or larger group) of instructions includes instructions only of a different character with respect to each other. For example, in the case of a pair of instructions, one instruction could be a floating point instruction, and the other instruction a fixed point instruction. In such cases, the additional comparators 88 are not required because results will not be passed from one instruction of the pair to the other instruction.

Another possible arrangement of instructions for the instruction pipe is that the instructions are interlocked in a manner to preserve their order of execution. In this arrangement, one of the instructions of each pair is considered the senior instruction, more recently issued by the instruction fetching unit, a junior instruction. This system, however, is arranged to operate in a manner such that the junior instruction of each pair must execute before the senior instruction of the next pair executes. In other words, an interlocking mechanism is required to assure that all instructions in a group have executed before the first instruction of the next group executes.

There are similar possible arrangements for the results pipeline when multiple results are present in each stage of the pipeline. Of course, the simplest case is that only a single result is present at each stage of the pipeline, and that result can be shared by all of the instructions of the pipeline. Other cases are the same as for the instruction stages. In other words, results that travel along the results pipeline in lockstep, or in disjoint sets. The disjoint sets can consist of results such as results from odd or even stages or results for names in one portion of the alphabet versus names in another portion. The final case for the results pipeline is that the results are present in the pipeline but must be coordinated in a manner so that the same or identification does not pass another instruction having the same name or identification.

The inventions discussed above have multiple aspects. First, more than one pipeline can flow in a given direction. For example, there can be three pipes flowing in one direction and two flowing in the other direction. The rules for interaction among pipelines are retained, just as for the case of a single pipe flowing in each direction. In other words, any data element flowing in one direction has the opportunity to interact with each and every data element flowing in the other direction.

Second, by using such a structure to implement the pipeline architecture, multiple instruction pipes will issue more instructions per unit time. Third, by using multiple result pipes performance is further improved. If results with distinguishable names are put in separate result pipes, the interlock to preserve the order of results may be omitted.

In a further embodiment of the invention, plural multi-issue pipelines are employed. In such an embodiment the organization of the system is a combination of that depicted in FIGS. 2 and 4. In other words, each of the plural pipelines of FIG. 4 is itself a multi-issue pipeline, as shown in FIG. 2. The control mechanism remains the same as for each of the two implementations separately.

The invention described herein can be embodied in a synchronous or an asynchronous processor. Synchronous implementations of the counterflow pipeline processor have local control of the stages provided by a combinational function on the state of neighboring stages. The control can use a fixed policy to decide between passing an instruction or result packet when either is possible. In one embodiment instructions are passed preferentially.

In embodiments of the invention in which an asynchronous advancement of the pipelines is performed, a technique known as arbitration is employed. An arbiter associated with each stage of the pipeline determines when the instruction (or result) is ready to advance. The arbiter circuit checks to see if three conditions are present before allowing advancement. These conditions are: (1) the item must be ready to advance so that, for example, if an instruction is being executed, the execution must be complete; (2) there must be space in the next stage; and (3) an instruction and result may not swap, i.e., they may not be exchanged between adjacent stages. These conditions require only local knowledge of the state of the stage and its neighbors.

The foregoing has been a description of a computer system for improving the performance of counterflow processors. It should be appreciated that modifications or variations may be made to the system without departing from the scope of the invention. The scope of the invention is set forth in the appended claims.

What is claimed is:

1. A computer system architecture comprising:

an instruction fetching unit;

a register file;

a pipeline connected between the instruction fetching unit and the register file, the pipeline including a plurality of stages;

each stage in the pipeline including:
   a first instruction register for storing a first instruction,
   a second instruction register for storing a second instruction, and
   a first results register for storing results; and wherein instructions are transferred in a first direction from stage to stage, and results are transferred in an opposite direction from stage to stage.

2. The system as in claim 1 wherein the first and the second instruction registers are each connected to pass information to, and receive information from, the first results register.

3. The system as in claim 2 wherein each instruction register includes:

an operand field;

a first source field for the operand;

a second source field for the operand; and a destination field.

4. The system as in claim 3 wherein each of the first source field and the second source field for the operand contain information for execution of the operand, and wherein the destination field stores data from the execution of the operand.

5. The system as in claim 3 wherein each of the first source, the second source and the destination fields includes:

a register name;

a value; and a validity bit.

6. The system as in claim 2 further comprising a group of comparators connected to the first instruction register, the second instruction register, and the first results register for comparing a portion of the contents of the instruction registers with a portion of the contents of the results registers.

7. The system as in claim 6 wherein:

each instruction register includes an operand field, a first source field for the operand, a second source field for the operand, and a destination field; and each results register includes at least a first and a second results fields.

8. The system as in claim 7 wherein each of the first source field, the second source field, the destination field, the first result field, and the second results field includes a register name.

9. The system as in claim 8 wherein the group of comparators comprises:

a first set of comparators connected to compare the register name of the first results field with the register name of each of the source and destination fields of each of the first and second instruction registers; and a second set of comparators connected to compare the register name of the second results field with the register name of each of the source and destination fields of each of the first and second instruction registers.

10. The system of claim 9 wherein the group of comparators further comprises a third set of comparators connected to compare the register name of each of the source fields of each of the first and second instructions with the destination field of the second instruction to control which of the first and second instructions executes first.

11. The system as in claim 9 wherein the comparators control the transfer of data values stored in the fields from one register to another.

12. A computer system architecture comprising:
   an instruction fetching unit;
   a register file;
   at least a first pipeline, a second pipeline, and a third pipeline connected between the instruction fetching unit and the register file, each of the pipelines including a plurality of stages;
      each stage of the first pipeline including a first instruction register for storing a first instruction,
      each stage of the second pipeline including a second instruction register for storing a second instruction, and
      each stage of the third pipeline including a first results register for storing results; and
   wherein instructions are transferred in a first direction from stage to stage in each of the first and the second pipelines, and results are transferred in an opposite direction from stage to stage in the third pipeline.

13. The system as in claim 12 wherein the system further includes a control circuit for each stage of the first pipeline which interlock circuit is connected to corresponding stages in each of the second pipeline and the third pipeline.

14. The system as in claim 13 wherein the control circuits are connected to each other to control the pipelines to prevent instructions from executing out of order.

15. The system as in claim 12 wherein the first and the second instruction registers are each connected to pass information to, and receive information from, the first results register.

16. The system as in claim 12 wherein each of the first and second instruction registers includes:
   an operand field;
   a first source field for the operand;
   a second source field for the operand; and
   a destination field.

17. The system as in claim 16 wherein each of the first source field and the second source field for the operand contain information for execution of the operand, and wherein the destination field stores data from the execution of the operand.

18. The system as in claim 16 wherein each of the first source, the second source and the destination fields includes:
   a register name;
   a value; and
   a validity bit.

19. The system as in claim 12 further comprising a group of comparators connected to the first instruction register, the second instruction register, and the first results register for comparing a portion of the contents of the instruction registers with a portion of the contents of the results registers.

20. The system as in claim 19 wherein:
   each instruction register includes an operand field; a first source field for the operand; a second source field for the operand; and a destination field; and
   each results register includes at least a first and a second results fields.

21. The system as in claim 20 wherein each of the first source field, the second source field, the destination field, the first result field, and the second results field includes a register name.

22. The system as in claim 21 wherein the group of comparators comprises:
   a first set of comparators connected to compare the register name of the first results field with the register name of each of the source and destination fields of each of the first and second instruction registers; and
   a second set of comparators connected to compare the register name of the second results field with the register name of each of the source and destination fields of each of the first and second instruction registers.

23. The system as in claim 22 wherein the comparators control the transfer of data values stored in the fields from one register to another.

24. The system as in claim 22 further comprising a third set of comparators connected to compare the register name of each of the first and second instructions with the destination name of the second instruction to assure execution of the first and second instructions in a proper order with respect to each other.

25. A computer system architecture comprising:
   an instruction fetching unit;
   a register file;
   at least a first pipeline, a second pipeline, and a third pipeline connected between the instruction fetching unit and the register file, each of the pipelines including a plurality of stages;
      each stage of the first pipeline including a first instruction register for storing a first instruction and a second instruction register for storing a second instruction,
      each stage of the second pipeline including a third instruction register for storing a third instruction and a fourth instruction register for storing a fourth instruction, and
      each stage of the third pipeline including a first results register for storing results; and
   wherein instructions are transferred in a first direction from stage to stage in each of the first and the second pipelines, and results are transferred in an opposite direction from stage to stage in the third pipeline.

* * * * *